United States Patent [19]

Shinoda et al.

[11] 4,178,004
[45] Dec. 11, 1979

[54] SPARE FUEL TANK FOR VEHICLE USE

[75] Inventors: Akibumi Shinoda, Handa; Masahiko Shimizu, Ohbu, both of Japan

[73] Assignee: Kabushiki Kaisha Toyoda Jidoshokki Seisakusho, Aichi, Japan

[21] Appl. No.: 853,231

[22] Filed: Nov. 18, 1977

[30] Foreign Application Priority Data

Nov. 20, 1976 [JP] Japan .............................. 51-155942[U]
Oct. 12, 1977 [JP] Japan .............................. 52-136655[U]

[51] Int. Cl.² ............................................ B60K 15/06
[52] U.S. Cl. .................................. 280/5 A; 137/264; 137/576
[58] Field of Search ............... 280/5 A, 5 R; 137/571, 137/576, 573, 574, 264

[56] References Cited

U.S. PATENT DOCUMENTS

| | | | |
|---|---|---|---|
| 1,033,897 | 7/1912 | Hutchins | 137/264 |
| 1,400,727 | 12/1921 | Codd | 137/571 |
| 1,419,145 | 6/1922 | Kleinberg | 137/576 |
| 1,535,642 | 4/1925 | Armknecht | 137/576 |
| 1,671,242 | 5/1928 | Huthsing | 137/576 |
| 2,644,514 | 7/1953 | Potter | 137/576 X |
| 3,884,255 | 5/1975 | Merkle | 280/5 A |
| 3,993,094 | 11/1976 | Spooner | 137/576 X |

Primary Examiner—John A. Pekar
Attorney, Agent, or Firm—Browdy and Neimark

[57] ABSTRACT

A spare fuel tank used for a main fuel tank, being a container with a bottom, having a reasonable volumetric capacity, of vertically elongated shape, and having a spare fuel suction pipe thereinside. It is separately manufactured from the main tank, nevertheless, does not need separate fuel supplying nor specific piping connection with the main fuel tank, owing to its oil tight but detachable securing to the inside of the main fuel tank, by means either of fixing the same to an upper cover plate of the main fuel tank or of fastening the same to a wall of the main fuel tank with suitable fastening means, and to the disposition of a fuel inlet opening for automatical and simultaneous fuel supplying at the time of fuel supplying to the main fuel tank.

7 Claims, 8 Drawing Figures

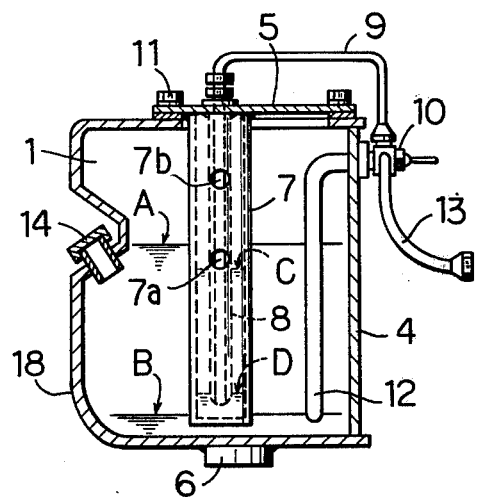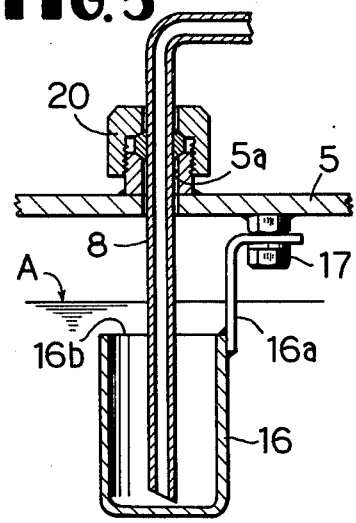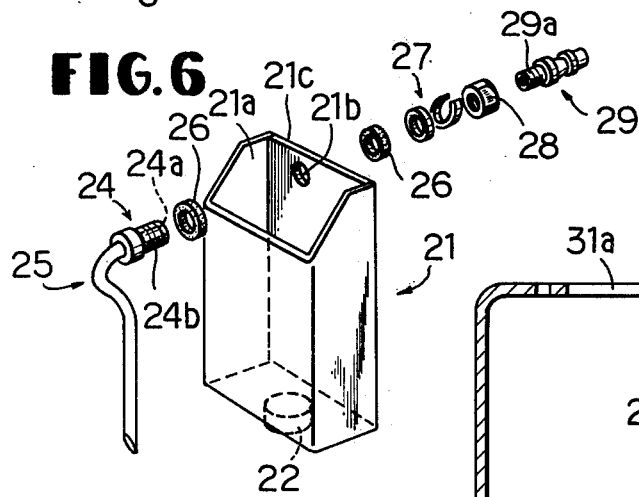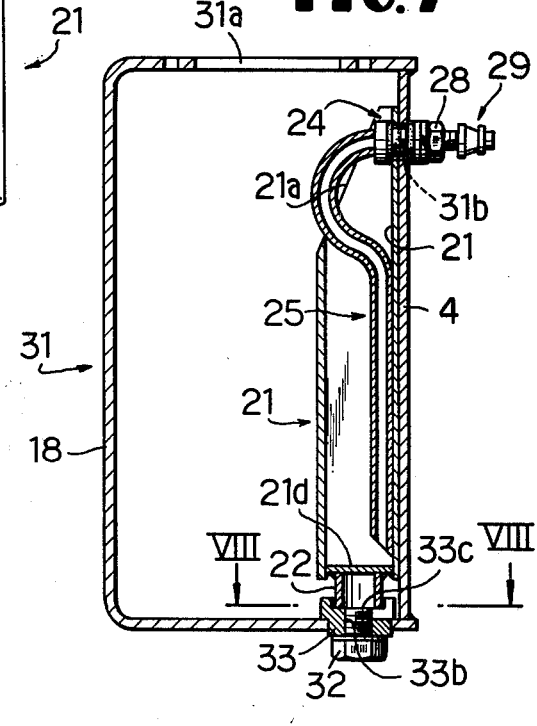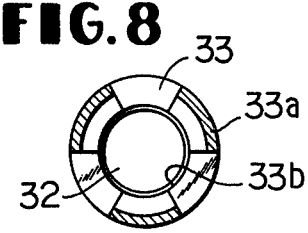

SPARE FUEL TANK FOR VEHICLE USE

BACKGROUND OF THE INVENTION

This invention relates to a spare or auxiliary fuel tank supplementarily disposed to a main fuel tank for containing internal-combustion-engine fuel.

Such spare fuel tanks (hereinafter called spare tank) have traditionally been disposed either as a separate type, outside the main fuel tank (hereinafter called main tank), or as a built-in type, inside the same and integrally constructed therewith. The separate type, the first type developed, is defective in that it must be supplied fuel independently of the main tank and that it must be constantly checked to see if it is empty as it has no connection with the main tank. In some cases it communicates with the main tank, but it must then be more carefully checked for fear of being inadvertently emptied. The latter type appeared as an advanced type, and is widely used today. In one bottom corner of a main tank a certain space is separately occupied, in this type, for a spare tank by means of secluding or separating plates welded to the main tank. This advanced built-in type is apparently very convenient and practical in that it does not need individual or dual supplying of fuel because of automatic and simultaneous fuel supplying to both, and that it dispenses with the communication through piping between both tanks.

This improved device is, however, not free from some disadvantages, such as (1) the difficulty of welding separating plates onto the bottom and side walls of the main tank because of the location thereof; (2) likelihood of fuel leakage at the welded portions due to difficulty of the welding operation. In a normal case wherein the main tank is constructed in a narrow and restricted space, the welding operation is difficult and apt to be defective. Once fuel leakage occurs at the welded portion, the fuel in the spare tank lowers as the fuel in the main tank decreases, by naturally flowing out into the main tank, and the spare tank becomes unable to function as a spare tank. In addition, repairing this spare tank is very difficult because it must be inevitably worked through a comparatively small opening of the main tank. Difficulty in cleaning the spare tank, in assembly and operating time, is another shortcoming of this type; when doing the absolutely necessary work of removing scale, slugs, and spatters after the welding, and when performing the regularly necessitated cleaning work of draining and removing deposits much difficulty in cleaning the inside of the tank is encountered because the tank has no drain.

In most assembly lines two types, i.e., vehicles with and without a spare tank, are required to be assembled parallelly; it is a rather rare case that all the vehicles assembled are installed with a spare tank. It will make the assemblying line very complicated and inconvenient to prepare two types of main tanks in one factory. Especially when the main tank is integrally constructed onto the channel-shaped frame, the frame itself should be manufactured in two different types, which leads to the double inventory of truck body frames with great unfavorable effects.

SUMMARY OF THE INVENTION

It is therefore a primary object of this invention to provide, eliminating the shortcomings of the prior art, a spare tank which is completely separated from the main tank, nevertheless, automatically and simultaneously supplied with fuel at the time of fuel supplying to the main tank, without the necessity of separate supplying of fuel thereto.

It is another object of this invention to provide a spare tank which is detachably secured inside the main tank.

It is still another object of this invention to provide a spare tank which does not need the constant checking of if it is unexpectedly emptied.

BRIEF DESCRIPTION OF THE DRAWINGS

FIG. 4 is a cross-section taken along the line IV—IV of FIG. 2;

FIG. 5 is a vertical cross-section of an essential part of a second embodiment;

FIG. 6 is an exploded perspective view of a spare tank in accordance with a third embodiment;

FIG. 7 is a vertical cross-sectional view of a main tank containing a spare tank, in accordance with the third embodiment, therein secured in place to the main tank; and FIG. 8 is a cross-sectional view taken along the line VIII—VIII of FIG. 7.

DETAILED DESCRIPTION OF PREFERRED EMBODIMENTS

Based on a main tank installed in a forklift truck, detailed description of some preferred embodiments of a spare tank will be stated hereunder, with reference to the accompanying drawings.

For better understanding three preferred embodiments will be described in the order of simplicity and comparative similarity of drawings to the prior art, i.e., FIG. 1. After having explained a first and second embodiments a third one, the most recently designed device will be minutely illustrated.

Figure 1:
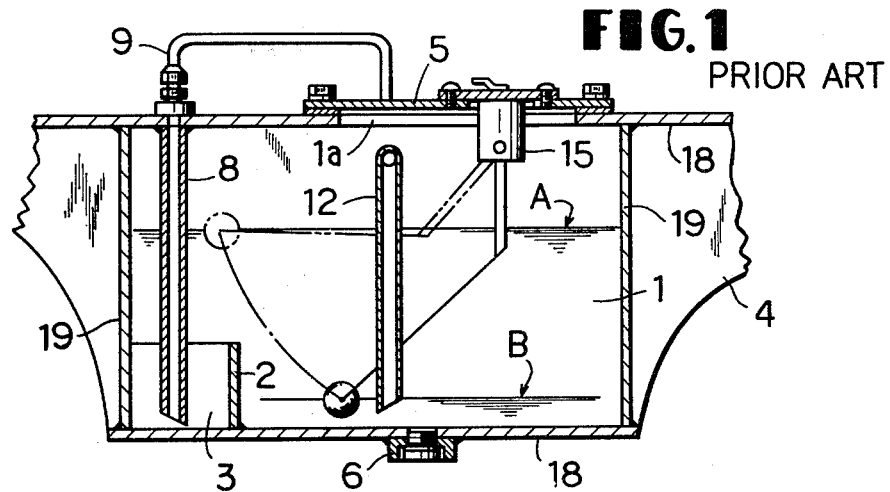
FIG. 1 is a sectional elevation of a conventional fuel tank with a spare tank built inside, for illustrating the prior art.

First of all in FIG. 1, prior art, a main tank 1 of generally rectangular shape in its plan is shown; a spare tank 3 of built-in type is shown separated at one bottom corner of the main tank 1 by means of secluding plates 2 welded to the bottom and walls of the main tank 1. The main tank 1 is formed by a channel-shaped frame member 18, a main plate member 4, and cross-plate members 19, all being welded to each other. A main fuel suction pipe 12 is provided for the main tank 1, and a spare-fuel suction pipe 8 which is connected to a connecting pipe 9, is provided for the spare tank 3. The normal full level of fuel is indicated by A and the lowest level, when the fuel in the main tank is exhausted, is indicated by B; a fuel gage 15 is provided for measuring the fuel level. The upper opening 1a of the main tank 1 for the purpose of welding operation inside, cleaning operation, etc., is tightly covered by a cover plate 5. Draining is carried out through a drain 6 disposed at the bottom of the main tank 1.

Figure 2:
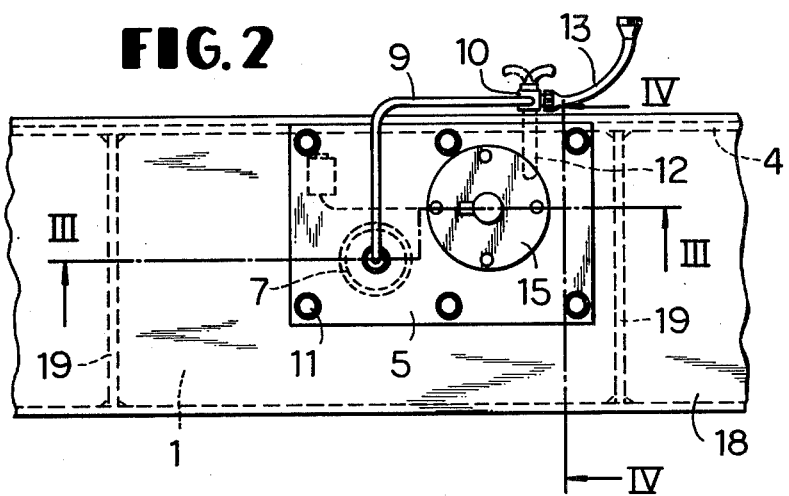
FIG. 2 is a plan view of a first embodiment of this invention.
Figure 3:
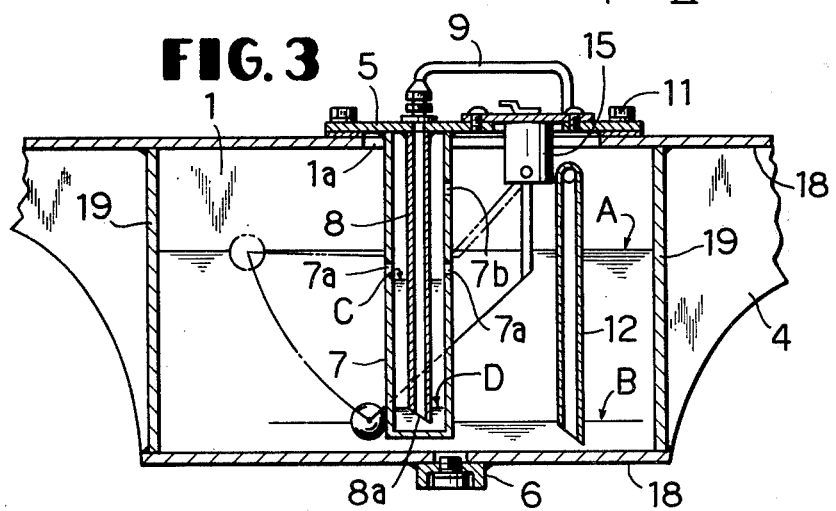
FIG. 3 is a cross-section taken along the line III—III of FIG. 2.

In FIGS. 2 to 4, illustrating a first embodiment, a main tank 1 is a closed hollow space rectangular in its cross-section formed by a main plate member 4, a channel-shaped side frame member 18, both constituting a principal part of the vehicle skeleton, and cross plate members 19, all being connected with each other. An opening 1a formed in the upper side of the main tank 1, that is in the upper side of the channel-shaped side frame member 18, is covered by a cover plate 5, which is detachably fastened in an oil-tight manner via a gasket to the upper side of the channel-shaped side frame member 18 with bolts 11. Onto the inside surface of the cover plate 5 is attached a spare tank 7 at the top thereof by welding. Throughout all the embodiments in this invention the main tank has an opening in the upper side thereof and a cover plate for covering the opening, and the spare tank should be of size passable through the opening, when it is mounted inside the main tank, as a prefabricated entirety.

The spare tank 7 is a container of cylindrical shape with a bottom, the upper opening of which is welded to the cover plate 5. It has at least one fuel inlet opening 7a located at a slightly lower position than the normal fuel full level A of the main tank 1, and is communicated with the same through that opening 7a at the level marked C. At a somewhat higher position than the full level A is disposed a vent 7b.

In the spare tank 7 is inserted a spare-fuel suction pipe 8, dependingly secured by welding to the inside surface of the cover plate 5, which pipe is provided with a fuel suction port 8a open close to the bottom of the spare tank 7 at the level marked D. The spare-fuel suction pipe 8 is connected to a switching valve 10 through a connecting pipe 9. This spare-fuel suction pipe 8 and a main fuel suction pipe 12 can be selectively communicated with the fuel supplying pipe 13 for the internal-combustion-engine.

Fuel is supplied, through a fuel intake port 14 (FIG. 4) which is formed in the side wall portion of the channel-shaped frame member 18, into the main tank 1. The amount of fuel in the main tank 1 is measured with a fuel gage unit 15 of a conventional design. Numeral 6 designates a drain of the main tank 1.

In a fuel tank of such a type, the fuel is supplied through the fuel intake port 14 into the main tank 1 and begins, when the same reaches the level of the fuel inlet opening 7a that is C line, to flow into the spare tank 7 and the air inside escapes from the vent 7b, which means the fuel is automatically filled into the spare tank 7, without any special manipulation. As the switching valve 10 is normally set to communicate the main fuel suction pipe 12 to the fuel supplying pipe 13, the fuel in the main tank 1 is first consumed as the engine works. In the event, during the traveling or operating of a vehicle, wherein the fuel in the main tank 1 is lowered to be unable to supply fuel to the engine any longer i.e. B level, a switchover operation of the valve 10 to the side of the spare tank 7 enables the spare-fuel suction pipe 8 to suck the fuel in the spare tank 7 and to put the vehicle again in a movable state, allowing the vehicle to move up to a place where it can be refueled.

As described above in greater detail, the spare tank 7 in this embodiment, irrespective of its separate manufacture from the main tank 1, can function just like an integrally made one with the main tank 1, without any troublesome separate fuel supplying and specific connection with the main tank 1, as is the traditional case with a separate type spare tank.

It can, nevertheless, eliminate all the inevitable defects accompanied by the built-in type, by means of separating the manufacture of both tanks.

In other words, the spare tank 7, in this case can be quite easily welded to the cover plate 5 because of its separate preliminary assemblying. Moreover, as the welded portion has no direct contact with the fuel there can be no fear of fuel leakage. Since the spare tank 7 can be removed from the main tank 1 together with the cover plate 5, the main tank 1 will be completely vacant, except only the main fuel suction pipe 12, for being readily cleaned.

Furthermore, common main tanks 1 may be employed for the two lines where both type vehicles, with and without spare tank, are assembled. It makes the administration of manufacture, storage, and assemblying of the main tanks simple and easy to control (when the main tank is integral with the main plate member 4, the channel-shaped side frame member 18, etc., it means the administration of those integral parts).

Even when a sudden demand change of converting the vehicles without a spare tank into those with it or vice versa, the changing operation may be easily achieved only by displacing the cover plate 5. Such a rapid conversion is absolutely impossible in the traditional built-in type spare tanks, wherein the main tank 1, the spare tank 3 and the vehicle frame are integrally constructed.

In a second embodiment, illustrated in FIG. 5, a spare tank 16 of cylindrical shape with a bottom, being provided with a welded bracket 16a thereto, may be secured to the cover plate 5 by means of which bracket and a bolt 17. The upper opening 16b of the spare tank 16 is so arranged as to be slightly lower than the full level A.

This type has, in addition to the above described strong points about the previous embodiment, another particular feature of easy cleanability, not only of the main tank 1 but also of the spare tank 16, because of the detachability of the latter from the cover plate 5. By merely oil-tightly closing the opening 5a, which is for inserting the spare-fuel suction pipe 8, and oil-tightly retaining the same, with a plug 20 or the like, common main tanks as well as common cover plates can be employed to all types of vehicles, which means simplification of assemblying line and parts inventory.

As for a third embodiment, the most recent design of the three, a description will be proceeded with reference to FIGS. 6 to 8. A main tank 31 is likewise with the previous embodiment formed in a channel-shaped side frame member 18 which is closed by a main plate member 4 and cross-plate members (not shown), welded with each other. Like traditional main tanks, it is provided with an upper opening 31a, in the upper side of the channel-shaped side frame member 18, for cleaning operation of the tank inside and for attaching a fuel gage (not shown), and an oil tight drain plug 32 at the bottom wall for discharging waste matter such as oil, water, deposit in the event of cleaning. Besides, a circular opening 31b is formed at an upper portion of the main plate member 4; and the drain plug 32 having a ring-shaped member 33 extending at the upper end thereof into the inside of the main tank 31, is provided with three projections 33a on the inner periphery thereof around an axial plug hole 33b. Into the ring-shaped member 33 extends a cylindrical member 22 projected from the lower side of the bottom wall 21d of the spare tank 21, being guided by the three projections 33a, for securely positioning the lower end of the spare tank 21.

A main fuel suction pipe (not shown) may be attached, together with the fuel gage (not shown), to either a cover plate (not shown) for closing the opening 31a or a side wall of the main tank 31. The spare tank 21 is a container having a bottom of rectangular shape in its cross-section vertically extending along the main plate member 4; it is provided with an upper opening 21a slantly cut for having a wide opening area. The shape of the spare tank is not necessarily limited to circular or rectangular but preferably be of uniform cross-section. On the side wall 21c of the spare tank 21 confronting to this opening 21a is formed a circular hole 21b of almost identical diameter with that of the circular opening 31b formed in the side wall, i.e., the main plate member 4.

The spare-fuel suction pipe 25 extends at its lower end almost as far as the upper surface of the bottom wall 21d, and is, at the upper end thereof, connected to one end of a mouthpiece 24, which passes through the circular hole 21b and the circular opening 31b and is provided with, at the other end thereof, a threaded portion 24b on the outer periphery and a tapped portion 24a on the inner periphery thereof.

The spare tank 21 and its spare-fuel suction pipe 25 are put into the main tank 1 through the upper opening 31a thereof. At this time, while fixing the lower end of the spare tank 21 to the drain plug 32 as described above, the tank 21 is secured to the main tank 31, by abutting the side wall 21c of the spare tank 21, wherein the circular hole 21b has been formed, to the side wall of the main tank 31, i.e., the main plate member 4, in such a manner that the circular hole 21b comes to register with the circular opening 31b, and by fastening the upper end of the spare-fuel suction pipe 25, which has been inserted into the spare tank 21. This is accomplished by passing the mouthpiece 24, through the circular hole 21b and the circular opening 31b, and a pair of gaskets 26, putting on the threaded portion 24b of the outwardly projected mouthpiece 24 in order to seal the hole 21b and the opening 31b from opposite sides, and screwing a nut 28 in with washer 27. In this process both the spare tank 21 and the spare-fuel suction pipe 25 are secured to the main tank 31 with one fastening means as described above. As can best be seen in FIG. 7, the upper opening 31a of the main tank 31 is close to the circular hole 21c and the circular opening 31b, and the slantly cut upper opening 21a of the spare tank 21 is comparatively large in its open area, so the above described fastening process is quite easy to be carried out manually through the upper opening 31a.

Fuel supplying into the so positioned spare tank 21 can be naturally performed, so long as the fuel in the main tank 31 exceeds the lowest portion of the upper opening 21a. The spare fuel can, when it is needed, be supplied to the engine by merely connecting the mouthpiece 24 to a necessary main fuel supplying pipe by means of screwing in the threaded portion 29a of a union 29 into the tapped portion 24a formed on the inner periphery of the mouthpiece 24. While the spare tank 21 is not needed, all that has to be done is to tightly close the circular opening 31b with an appropriate plug (not shown).

As described above in greater detail the spare tank 21 with a bottom of rectangular shape in its cross-section, although the shape of which is not limited to rectangular, can be securely fixed to the main tank 31 only by means of the mouthpiece 24, the drain plug 32, and the ring-shaped member 33. Since there is no need of modifying the shape of the main tank 21, even when the production of two types of forklift trucks is required, it is not necessary to manufacture, to store, and to distribute two kinds of truck body frames, with and without a spare tank, for the assemblying lines. It extremely simplifies the administration of the manufacture and inventory. Even in the event of a sudden demand change of manufacturing forklift trucks with a spare tank to without a spare tank and vice versa, an easy adaptation can be taken.

Characteristic features of this embodiment can be summarized as follows:

(1) fastening and unfastening of the spare tank 21 to the main tank 31 is simple and easy because of (a) utilizing the mouthpiece 24 at the upper portion and (b) utilizing the drain plug 32, which is an inevitable element for a fuel tank, at the lower portion;

(2) inserting the spare tank 21 into the main tank 31 can be easily worked through the upper opening 31a of the main tank 31;

(3) dual purpose use of the mouthpiece 24 for taking out of the spare-fuel suction pipe 25 as a fastening means of the three elements, i.e., the spare-fuel suction pipe 25, the spare tank 21, and the main tank 31;

(4) simplification of the main tank structure can be achieved by this favorable design wherein the disposition of the spare tank 21 does not affect the structure of the main tank 31;

(5) cleaning the inside of the main tank 31 can be performed quite easily by removing the drain plug 32, and particularly by removing the easily detachable spare tank 21; and (6) easy cleaning of the spare tank 21 itself, which can be carried out in a very short time by removing it from the main tank 31, is far beyond comparison with the traditional time-consuming work.

It will be obvious to those skilled in the art that various changes may be made without departing from the scope of the invention and the invention is not to be considered limited to what is shown in the drawings and described in the specification.

What is claimed is:

1. A spare fuel tank for a main fuel tank having a fuel inlet and provided with a top wall having an opening therein and a cover plate for covering said opening, said spare tank comprising a vertically elongated container with a bottom, extending vertically inside said main fuel tank and being fixed to said cover plate, said spare fuel tank being of size passable through said opening as a prefabricated entirety;

at least one spare tank fuel inlet opening for natural flow-in of fuel at the time of fuel supplying to said main fuel tank formed at a position slightly lower than the normal full level of the fuel in said main fuel tank;

a spare-fuel suction pipe inserted into said spare tank such that the lower end thereof almost reaches the bottom of said spare fuel tank; and fastening means for securely and detachably attaching said spare fuel tank and said spare-fuel suction pipe oil-tightly to said main fuel tank via said cover plate.

2. A spare fuel tank for a main fuel tank having a fuel inlet and provided with an upper wall having an opening therein and a cover plate for covering said opening, said spare tank comprising a container of vertically elongated cylindrical shape, substantially uniform in cross-section thereof, extending vertically inside said main fuel tank reaching as far as the bottom of said main fuel tank, having a bottom, and being welded to said cover plate, said spare fuel tank being of size passable through said opening as a prefabricated entirety;

at least one spare tank fuel inlet opening for natural flow-in of fuel at the time of fuel supplying to said main fuel tank formed at a position slightly lower than the normal full level of the fuel in said main fuel tank;

at least one opening for venting air inside formed in said spare fuel tank at a position slightly higher than the normal full level of the fuel in said main fuel tank;

a spare-fuel suction pipe welded to said cover plate and inserted into said spare tank such that the lower end thereof almost reaches the bottom of said spare fuel tank; and fastening means for securely and detachably fastening said cover plate having said spare fuel tank welded on the inner side thereof, onto the upper side of said main fuel tank so as to completely cover said opening.

3. A spare fuel tank for a main fuel tank having a fuel inlet and provided with an upper wall having an opening therein and a cover plate for covering said opening, said spare tank comprising a container of vertically elongated cylindrical shape, substantially uniform in cross-section thereof, extending vertically inside said main fuel tank reaching as far as the bottom of said main fuel tank, and being secured to said cover plate by means of a bracket welded to the upper end of said spare fuel tank at one end thereof, and a bolt for fastening the other end of said bracket to the inner side of said cover plate, said spare fuel tank having a bottom and being of size passable through said opening as a prefabricated entirety;

a substantially full opening at the upper end thereof for natural flow-in of fuel at the time of fuel supplying to said main fuel tank so positioned as to be slightly lower than the normal full level of the fuel in said main fuel tank;

a spare-fuel suction pipe, oil-tightly sustained at a spare-fuel-suction-pipe-inserting opening formed in said cover plate of said main fuel tank, and inserted thereinto such that the lower end thereof almost reaches the bottom of said spare fuel tank; and fastening means for securely and detachably fixing said cover plate, having said spare fuel tank secured on the inner side thereof by means of said bracket and said bolt, onto the upper side of said main fuel tank so as to completely cover said opening.

4. A spare fuel tank used for a main fuel tank having a bottom wall with a drain control means therein and side walls, which is provided with an opening in the upper side thereof and a cover plate for covering the opening, comprising a container having a bottom, a pair of opposite end walls and a pair of opposite side walls, one of which is lower than the other, and being of vertically elongated substantially rectangular shape in cross-section thereof, for extending vertically inside the main fuel tank reaching as far as the bottom of the main fuel tank along a side wall of the main fuel tank, said spare fuel tank being of size passable through said opening as a prefabricated entirety;

means for natural flow-in of fuel at the time of fuel supplying to the main fuel tank comprising an upper opening defined by the lower height of one of said side walls and arranged such that at least the lowest portion of said upper opening is slightly lower than the normal full level of the fuel in said main fuel tank;

a spare-fuel suction pipe having an upper end, a lower end, and inserted into said open tank such that the lower end of said suction pipe almost reaches the bottom of said spare fuel tank; and fastening means for securely and oil-tightly but detachably attaching said spare fuel tank including said spare-fuel suction pipe, to the side and the bottom walls of the main fuel tank, said fastening means further comprising a mouthpiece which passes through a side wall of said spare fuel tank and a side wall of the main fuel tank for fastening oil-tightly but detachably said upper end of said spare-fuel suction pipe, said spare fuel tank, and the main fuel tank together, and a lower connecting means to connect said bottom of said spare fuel tank to the drain control means at the bottom wall of the main fuel tank and to prevent said bottom of said spare fuel tank from moving relatively to the bottom wall of the main fuel tank.

5. A spare fuel tank system supplementarily disposed in a main fuel tank system which includes a main fuel tank having a bottom wall, a side wall, a top wall, an opening formed in said top wall, a cover plate for covering said opening, and drain control means including a drain plug disposed at said bottom wall, said spare fuel tank system comprising:

a spare fuel tank in the form of a container positioned within said main fuel tank; said spare tank vertically extending inside said main fuel tank and reaching as far as the bottom of said main fuel tank, being of size passable through said opening as a prefabricated entirety, and having a bottom wall, a first side wall extending along the side wall of the main fuel tank, a second side wall shorter in height than said first side wall and spaced opposite to said first side wall by two opposite end walls; and means for natural flow-in of fuel at the time of fuel supplying to said main fuel tank comprising an upper opening defined by the shorter height of said second side wall and arranged such that at least the lowest portion of said upper opening is slightly lower than the full level of the fuel in said main fuel tank;

a spare-fuel suction pipe inserted into said spare fuel tank such that the lower end thereof almost reaches the bottom of said spare fuel tank and the upper end thereof is provided with a mouthpiece, which passes through said side wall of said main fuel tank and said first side wall of said spare fuel tank for fastening oil-tightly but detachably said spare-fuel suction pipe itself and said spare fuel tank to said main fuel tank; and means for connecting said bottom of said spare fuel tank with said drain control means for preventing said bottom of said spare fuel tank moving relatively to said bottom wall of said main fuel tank.

6. A spare fuel tank system claimed in claim 5, wherein said main fuel tank system comprises a main suction pipe for sucking fuel from said main fuel tank, and said spare-fuel suction pipe and said main suction pipe are selectively connected to a common fuel supplying pipe via a switching valve.

7. A spare fuel tank system in accordance with claim 5, wherein said means for connecting said bottom of said spare fuel tank with said drain control means comprises a projection extending downwardly from the bottom wall of said spare fuel tank, said drain control means for said main fuel tank comprising a ring-shaped member secured to the bottom wall of said main fuel tank for threadably receiving said drain plug from below the bottom wall of said main fuel tank, said ring-shaped member engageably receiving said downwardly extending projection for preventing horizontal movement of said downwardly extending projection and thereby effecting said preventing of the bottom of said spare fuel tank from moving relatively to said bottom wall of said main fuel tank.

* * * * *